(12) United States Patent
Platt (10) Patent No.: US 6,189,390 B1
(45) Date of Patent: *Feb. 20, 2001

(54) METHOD AND APPARATUS FOR MEASURING GAS VELOCITY OR OTHER FLOW CHARACTERISTIC

(75) Inventor: Robert J. Platt, Elmhurst, IL (US)

(73) Assignee: Compliance Instrument, Inc., Elmhurst, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/054,296

(22) Filed: Apr. 2, 1998

(51) Int. Cl.$^7$ .................................................... G01F 1/46

(52) U.S. Cl. ........................................ 73/861.66; 73/756

(58) Field of Search ........................... 73/861.65, 861.66, 73/756

(56) References Cited

U.S. PATENT DOCUMENTS

| | | | |
|---|---|---|---|
| 1,645,449 | * 10/1927 | Proebstel | 73/861.66 |
| 2,714,819 | * 8/1955 | Clark | 73/861.66 |
| 3,685,355 | * 8/1972 | DeBaun | 73/861.66 |
| 3,748,453 | 7/1973 | McCorkle | 235/194 |
| 3,831,448 | 8/1974 | Kors et al. | 73/212 |
| 4,372,171 | 2/1983 | Brandt, Jr. | 73/861.66 |
| 4,419,898 | 12/1983 | Zanker et al. | 73/861.02 |
| 4,462,261 | 7/1984 | Keyes et al. | 73/861.02 |
| 4,516,425 | * 5/1985 | Chollet et al. | 73/861.65 |
| 4,668,102 | 5/1987 | Mott | 374/142 |
| 4,765,751 | * 8/1988 | Pannone et al. | 73/861.66 |
| 4,773,252 | 9/1988 | Jarolics | 73/23 |
| 4,833,917 | 5/1989 | Wilson | 73/189 |
| 4,911,021 | 3/1990 | Shortridge | 73/861.66 |
| 4,912,973 | 4/1990 | Milewski et al. | 73/202 |
| 5,109,711 | 5/1992 | Wendt | 73/863.11 |
| 5,241,866 | * 9/1993 | Rossow | 73/861.66 |
| 5,297,432 | 3/1994 | Traina et al. | 73/864.34 |
| 5,365,459 | 11/1994 | Perry | 364/509 |
| 5,392,645 | 2/1995 | Kleppe | 73/195 |
| 5,394,759 | 3/1995 | Traina | 73/861.67 |
| 5,433,114 | 7/1995 | Cook et al. | 73/756 |
| 5,442,958 | * 8/1995 | Hagen | 73/861.66 |
| 5,458,010 | 10/1995 | Traina et al. | 73/864.12 |
| 5,481,925 | 1/1996 | Woodbury | 73/861.66 |
| 5,509,313 | 4/1996 | Traina et al. | 73/861.065 |
| 5,520,048 | 5/1996 | Traina et al. | 73/335.06 |
| 5,535,634 | 7/1996 | Traina et al. | 73/861.65 |
| 5,559,279 | 9/1996 | Traina et al. | 73/3 |
| 5,637,809 | 6/1997 | Traina et al. | 73/864.12 |

OTHER PUBLICATIONS

Environmental Measurement Research Corp., "Gas Flow Monitor System," Brochure (1992).

United Sciences Inc., "Auto–Probe 2000," Brochure (1994).

Partial European Search Report dated Jul. 21, 1999 for Application No. EP 99 40 0799.

Wendt, B.J. et al., "An Inexpensive and Effective Five–Hole Probe Rake," *Experiments in Fluids*. vol. 19, No. 4, Aug. 1, 1995: 295–296.

* cited by examiner

*Primary Examiner*—Harshad Patel
(74) *Attorney, Agent, or Firm*—Marshall, O'Toole, Gerstein, Murray & Borun (57) ABSTRACT

A method and apparatus for measuring gas flow in a conduit includes the steps of providing a plurality of gas flow measuring devices, positioning the gas flow measuring devices at a plurality of positions in the conduit, and substantially simultaneously measuring the gas flow at each position. A gas flow measuring apparatus includes a plurality of flow-measuring probes, each probe including one or more gas flow measuring devices, a separate pressure transducer connected to each probe, a data logger connected to the transducers, and a computer connected to the data logger.

24 Claims, 7 Drawing Sheets

METHOD AND APPARATUS FOR MEASURING GAS VELOCITY OR OTHER FLOW CHARACTERISTIC

FIELD OF THE INVENTION

The present invention relates generally to methods and devices for measuring gas flow, and more particularly to a method and apparatus for measuring gas flow at a plurality of positions in a conduit.

BACKGROUND ART

There are many circumstances where it is necessary to obtain accurate measurements of the velocity and volumetric flow rates of gas through a stack or duct. Frequently, those circumstances relate to measuring and monitoring of pollutant emissions from industrial sources of air pollution. Many of the methods that are used to measure and monitor pollutant emissions under state and federal regulations include provisions and procedures to determine flow rates. As government regulations have evolved and become more stringent, there has been more and more scrutiny placed on the accuracy of those flow rate measurement methods because of their increased impact on the operating and compliance cost of regulated industrial sources. Separately, there are many engineering needs to more accurately measure and observe gas flow characteristics and changes in those characteristics over a cross section of a stack or duct and over a period of time. Those engineering needs include obtaining more refined design data for use in the design of more effective pollution control equipment and to improve the efficiency and effectiveness of industrial processes in general.

The most significant problem in measuring flow rates through a stack or duct is that the actual gas velocity can be different at different cross sectional positions of the stack or duct. In addition, those velocities are not uniform over time and also not predictable even in the steady state operation of the industrial process. The gas flow at individual positions of the cross section may be flowing at some angle to the center line of the duct and that angle may change over short periods of time. These variations across the duct cross section are typically caused by variations in the operation in the industrial process emitting the gas stream and/or the physical structure of the duct through which the gases are flowing.

The United States Environmental Protection Agency (U.S. EPA) has promulgated regulations which include two methods to be used in measuring the flow of gas through a stack or duct for purposes of administering its regulations regarding emission of pollutants to the atmosphere. Those methods are referred to as U.S. EPA Reference Methods 1 and 2. Method 1 is used to determine the locations of positions on the cross section or traverse area of the duct at which readings are to be taken using Reference Method 2. Method 2 typically uses an S-type pitot tube to obtain a differential pressure reading at each of the points on the traverse, all of which are averaged together and used in a calculation to determine the actual volumetric flow rate of the gas through the stack. That flow rate is then used in another calculation which includes the concentration of an individual pollutant being measured (obtained using another reference method) in the calculation of the total emission rate of a source for regulatory compliance purposes. Any error in the measurement of the flow rate, therefore, is directly translated to an error in the measurement of the individual pollutant or pollutants being measured. In addition, these same readings are used to set and check the calibrations of monitors used to continuously measure the flow rate of gases through the stack. The error is similarly translated and can have significant cost and operational impacts on the regulated industrial source.

Method 2 requires that the tester use an S-type pitot tube to obtain differential pressure readings at specified points over a cross section of the duct being tested in order to account for the variability of the flow rate across the cross section. The tester is asked to extend a moveable pitot tube assembly some distance into the duct to a prescribed point, align it parallel to the center line of the duct and hold it there for a number of seconds to allow a second person to take the differential pressure reading from a fluctuating incline manometer. The tester then moves sequentially to each of the other points, makes the alignment and waits a few moments again to allow the second tester to take the readings. This continues until all points on the traverse are read. During this process, the pitot assembly must be removed from the duct completely and moved to another opening or openings to get access to position the pitot tube at all of the traverse points, sometimes taking an extended period of time. Thereafter, repetitions of that process are made to increase the confidence in the accuracy of the measurement by having more data points, to average and to account for variations in the gas flow over time. As a practical matter, there are a number of disadvantages with the use of this manual method in actual field conditions which have a significant impact on the accuracy of the measurements derived. They include:

1. The imprecise method of positioning and aligning the pitot tube assembly sufficiently close to the specified sample point and then repositioning it again at the same point on subsequent repetitions of the traverse;

2. The imprecise method of "eyeballing" to average the fluctuating inclined manometer indication of the differential pressure at each sample point;

3. The reading of the parameters of the gas flow at the individual sample points on a traverse at different times (i.e., sequentially) in a circumstance where instantaneous changes in gas flow parameters over the cross section are common. In other words, using the manual method there is no way to account or adjust for the variations in actual flow parameters at all other points on the traverse when a reading is taken at any one of the sample points at a specific time; and 4. The amount of time required to complete a traverse is significant and therefore costly and as such inhibits the ability as a practical matter to make more repetitions to increase the confidence in the accuracy of the measurements.

Prior art methods of determining gas flow rate, such as those disclosed in Traina, U.S. Pat. No. 5,394,759 and Traina et al., U.S. Pat. No. 5,509,313, involve the use of a single pitot tube to measure differential pressures at a variety of positions. The Traina '759 patent in particular discloses apparatus for automatically moving the pitot tube to a number of different positions in the duct and repositioning it at the same position in subsequent repetitions. The Traina et al. '313 patent discloses a method of measuring "true flow direction rate" at a variety of positions in order to more accurately measure gas flow. The premise of the latter method is that a more accurate measurement of gas flow rate is obtained by finding and adjusting for the angle of the true flow direction at each sample point versus the center line of the duct.

In the method of the Traina '313 patent, a pitot tube is automatically positioned at a sample point and displaced 90 degrees from a null point. Differential pressure readings are then taken and the true flow direction angle is recorded. The differential pressure readings are used to calculate flow rate considering the measured flow direction angle. Even though an automated system is used to control the repositioning of the pitot tube, the methods utilized in the foregoing Traina patents have the same disadvantage of the manual method described above in that they fail to determine flow rate at more than one position at any given time. In addition, it is possible for the true flow direction angle to change in the short time it takes for the pitot tube to be repositioned from the null point reading to the 90 degree position. As noted above, because there are continuous and quickly-occurring variations in gas flow rate and direction in a typical duct, calculations of flow rate based upon measurements at different points and at different times have significant accuracy limitations.

A commercial gas flow monitor system sold by Environmental Measurement Research Corporation (EMRC) includes four pitot tubes that are independently positioned in an axial plane within an exhaust stack. Rather than individually measuring the differential pressure or velocity of gas at each of the four positions, the EMRC device combines the output lines of the four pitot tubes into a single manifold, which is then connected by a single line to a pressure transducer. Accordingly, the EMRC device provides a single flow rate value that is based on four inputs, but fails to measure or account for differences in flow rates depending on position in the exhaust stack. This device is not intended to take measurements over an entire traverse, nor is it intended to actually measure flow, but rather it monitors and indicates flow changes.

Consequently, there is a need for a device that performs all of the following:

1. Eliminates the positioning and repositioning error associated with manual methods;
2. Eliminates the manual reading and recording of gas flow rate parameters;
3. Reads and records flow rate parameters at all points on a specified traverse substantially simultaneously, to substantially eliminate the variable of time between readings and individual sample points; and
4. Effects a substantial reduction in the time to take a complete traverse of such readings to increase the number of repetitions that can be made to improve the accuracy of those measurements and reduce cost.

SUMMARY OF THE INVENTION

According to one aspect of the present invention, a method for measuring gas flow in a conduit includes the steps of providing a plurality of gas flow measuring devices, positioning the gas flow measuring devices at a plurality of positions in the conduit, and substantially simultaneously measuring the flow of gas at each position.

According to another aspect of the present invention, a gas flow measuring device includes a plurality of flow-measuring probes, each probe including one or more gas flow measuring devices, a separate pressure transducer connected to each probe, a data logger connected to the transducers, and a computer connected to the data logger.

Other advantages of the invention will be apparent to those skilled in the art from the following detailed description taken in conjunction with the drawings and the appended claims.

DETAILED DESCRIPTION OF THE INVENTION

Figure 1:
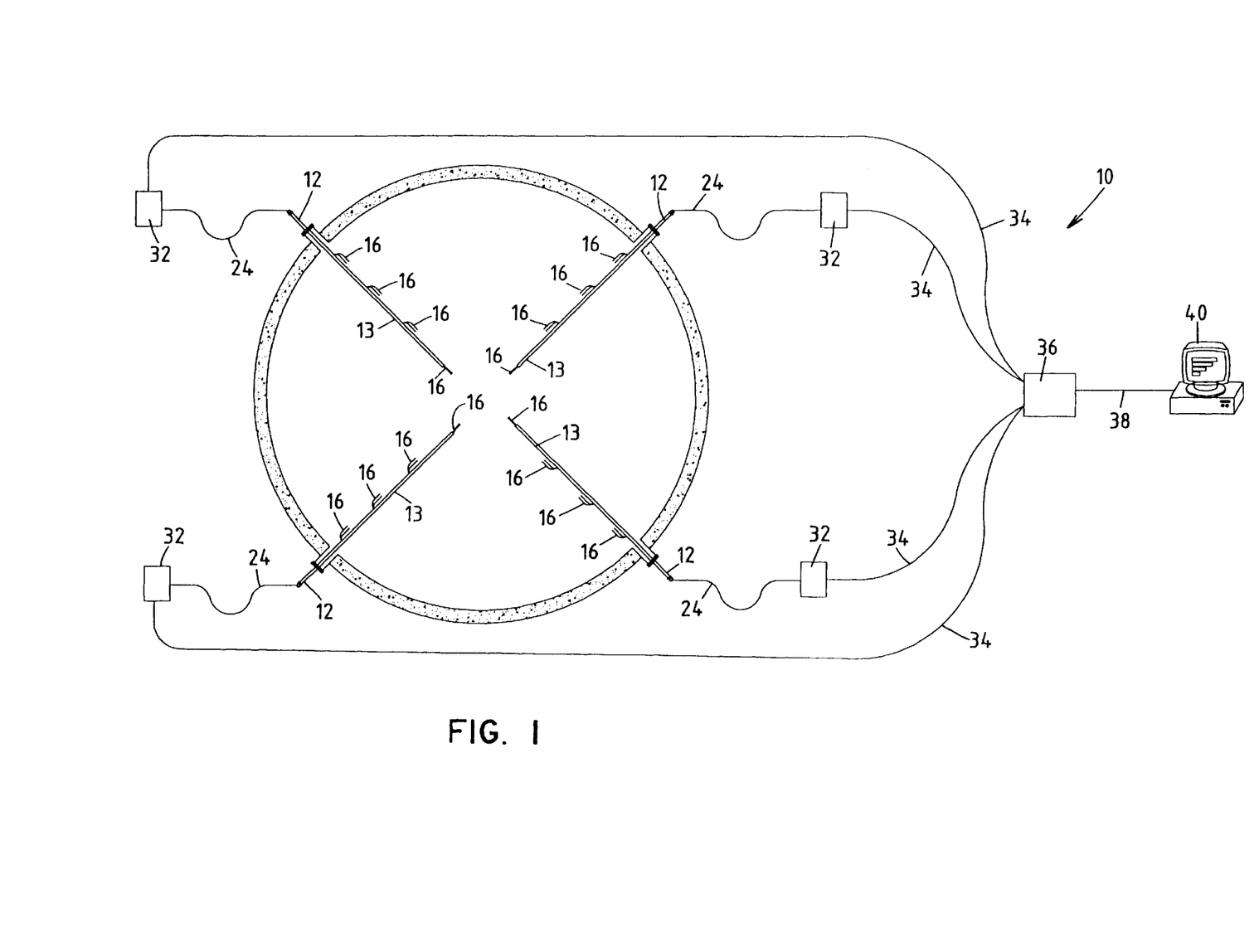
FIG. 1 comprises a cross-sectional view of a gas velocity monitoring system according to the invention installed in a cylindrical gas conduit.
Figure 2:
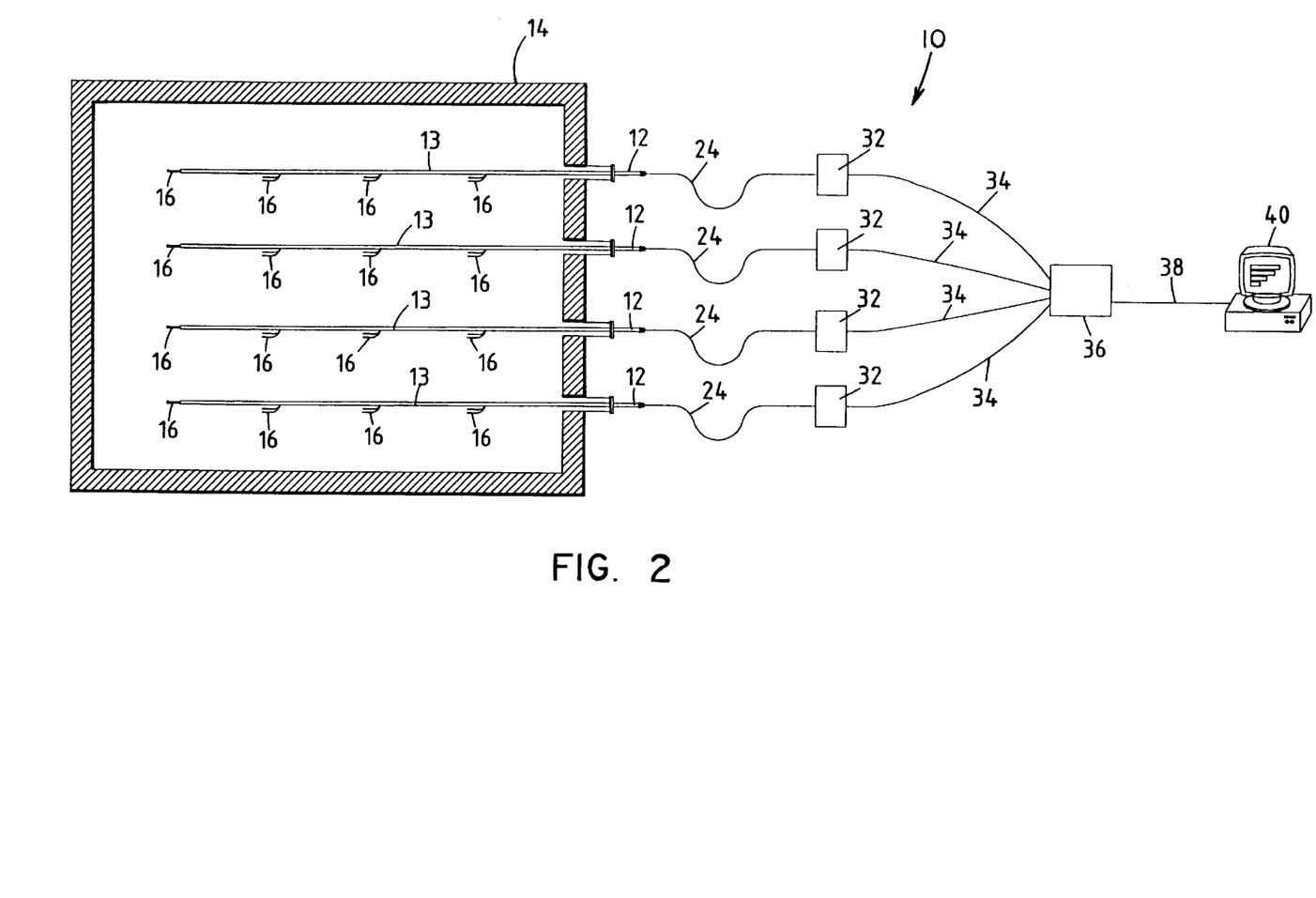
FIG. 2 comprises a cross-sectional view of the gas velocity monitoring system of FIG. 1 installed in a rectangular gas conduit.
Figure 3:
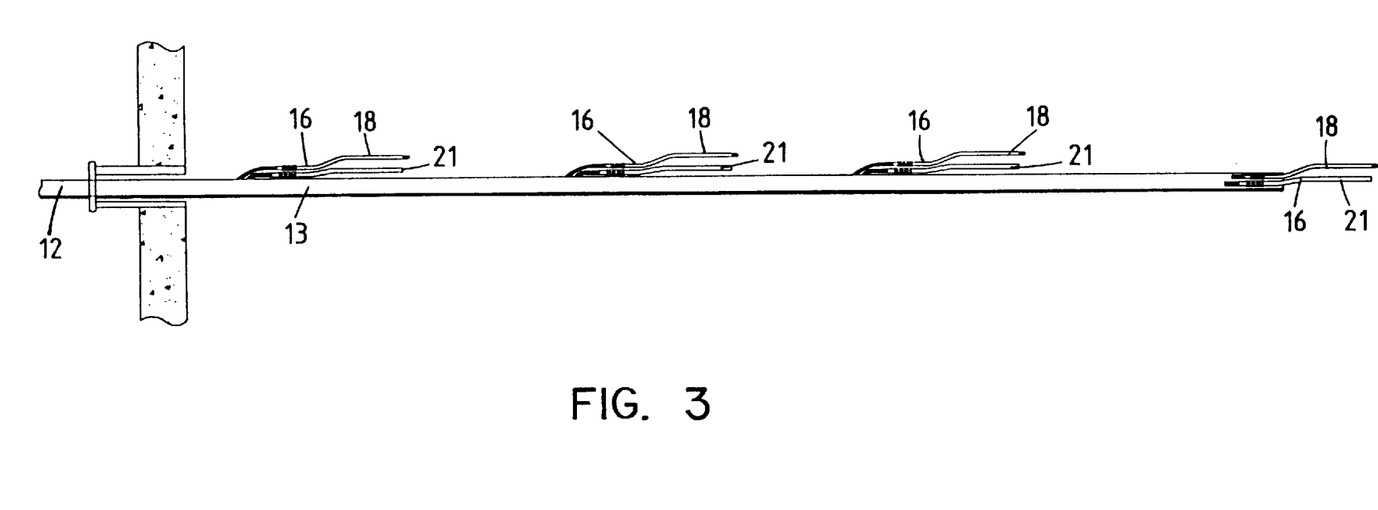
FIG. 3 comprises a plan view, partially in section, of a gas velocity sensing probe of the gas velocity monitoring system of FIG. 1.
Figure 4:
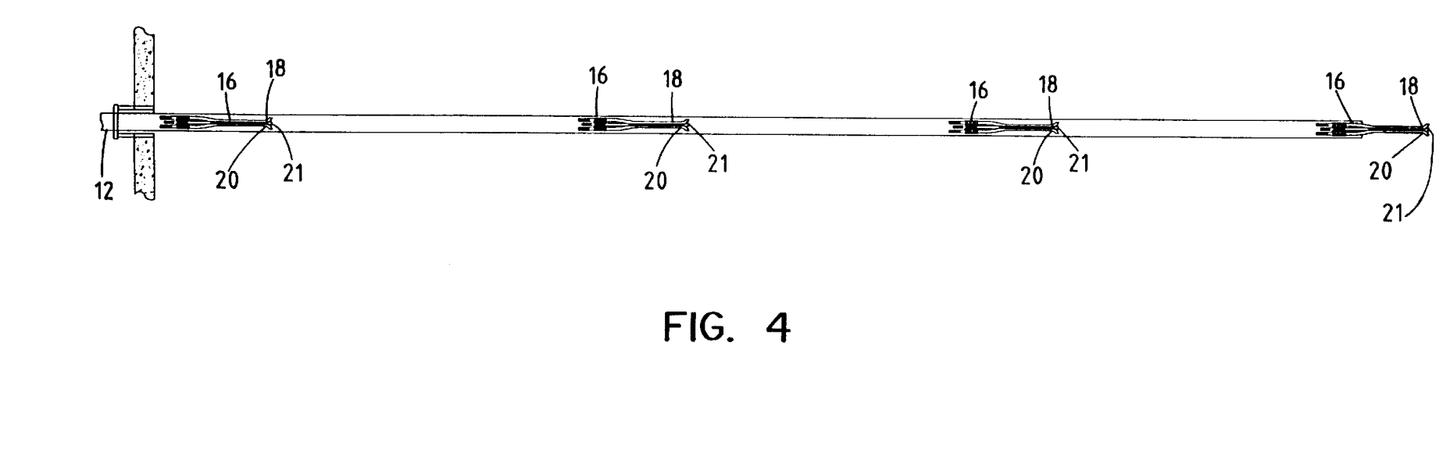
FIG. 4 comprises a side elevational view of the gas velocity sensing probe of FIG. 3.

Referring now to the drawings, wherein like reference numerals designate identical or corresponding parts throughout the several views, and more particularly to FIG. 1 thereof, a gas flow monitoring system 10 includes four (or any other number) gas flow measuring devices in the form of velocity sensing probes 12, each installed at either a single axial location or at multiple axial locations in a gas conduit 14, such as a gas stack or duct. It should be noted that the present invention is useful to detect gas pressure or velocity (or one or more other flow parameters, flow distribution, temperature or the like) in a conduit of any cross-sectional configuration. For example, FIG. 2 shows a substantially similar gas flow monitoring system 10 installed in a gas conduit 14 having a rectangular cross-sectional shape. Each velocity sensing probe 12 includes a support member 13 to which is mounted four s-type pitot tubes 16. If desired, a different number of pitot tubes 16 can be secured to each support member 13. Also, some or all of the S-type pitot tubes 16 can be replaced by a like member of different gas flow parameter sensors, such as standard pitot tubes, 3-D pitot tubes, hot wire anemometers, vane anemometers, or other devices.

As shown in FIGS. 3, 4, 6 and 7 each s-type pitot tube 16 includes a static pressure tube portion 18 and an impact pressure tube portion 20. A temperature sensor 21, such as a thermocouple or thermistor, or any other suitable device, may (or may not) be mounted in a tubular housing member associated with each pitot tube 16 positioned between the pressure tubes 18, 20. It should be noted that the temperature sensors on each sensing probe 12 may or may not be needed, depending upon the particular gas flow parameter sensor used. Alternatively, no gas flow parameter sensors may be used, in which case only temperature sensors (or other sensors) would be employed.

Figure 5:
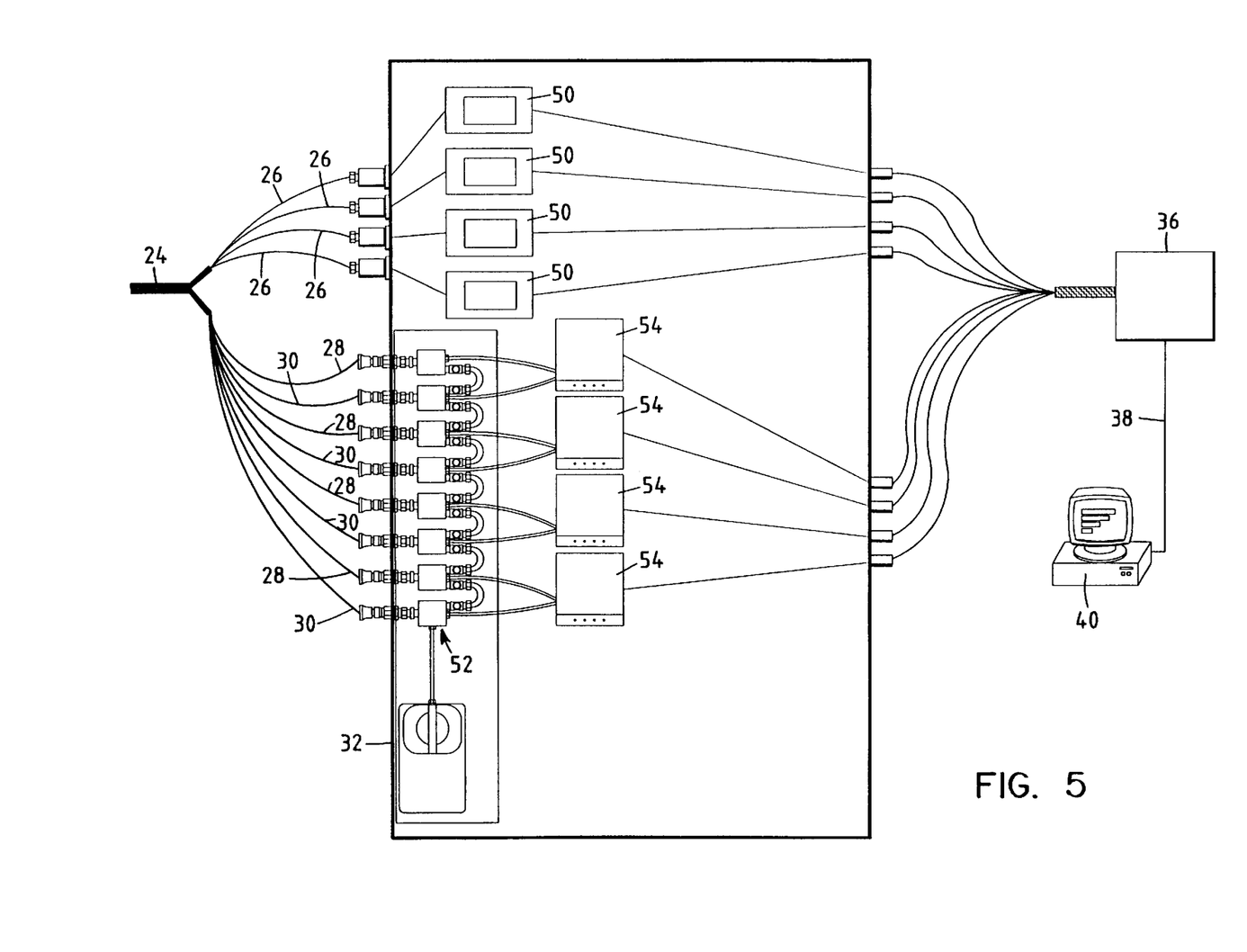
FIG. 5 comprises a schematic view of a sensor reading conversion assembly of the gas velocity monitoring system.
Figure 6:
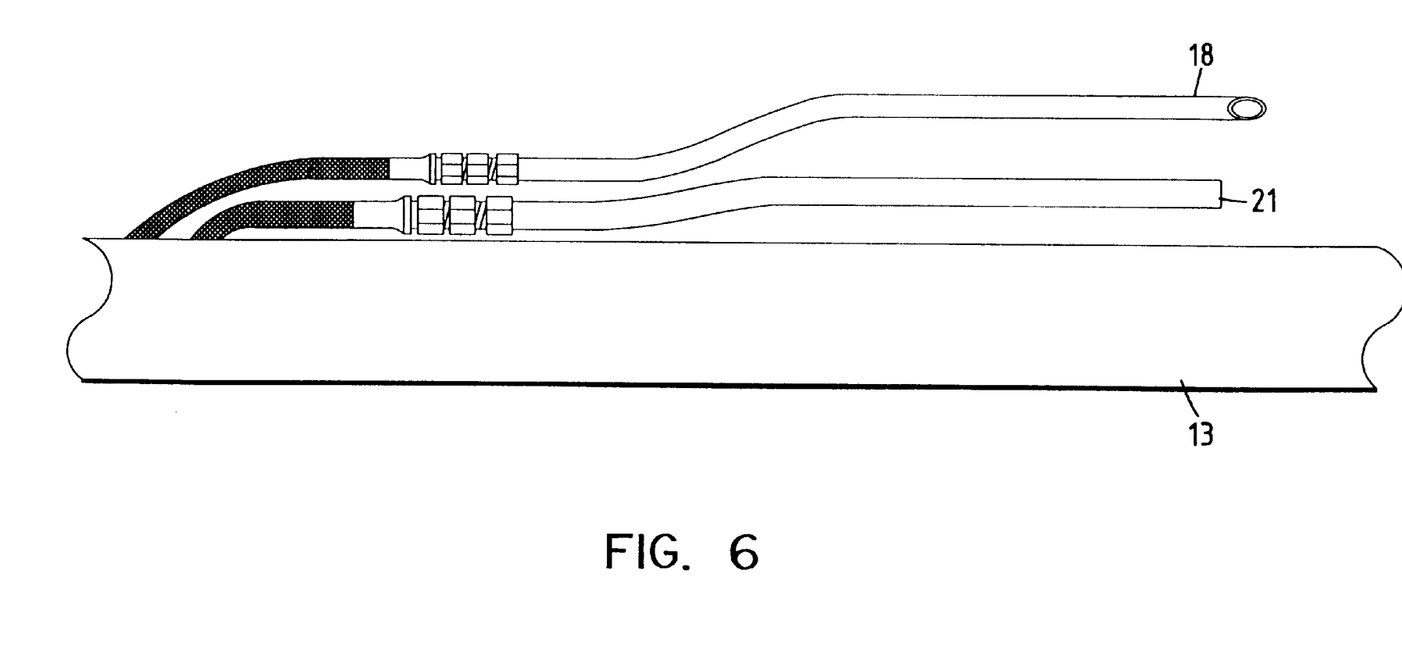
FIG. 6 comprises an enlarged, fragmentary plan view of a portion of the sensing probe of FIG. 3.
Figure 7:
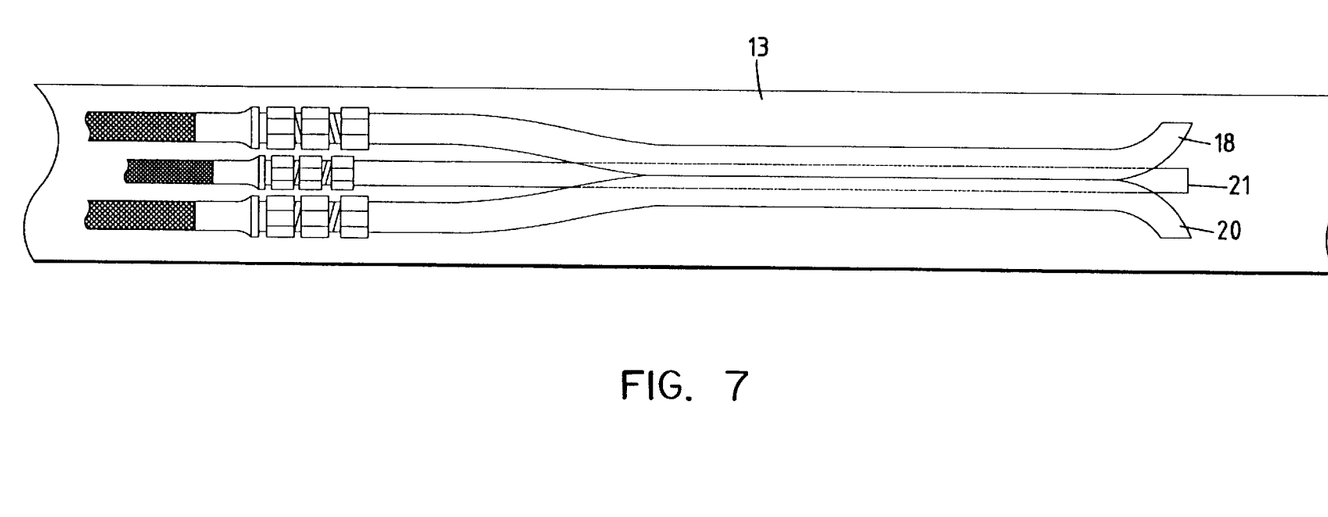
FIG. 7 comprises an enlarged, fragmentary side elevational view of a portion of the sensing probe of FIG. 4.

As shown in FIG. 5, each gas velocity sensing probe 12 is connected to an associated sensor reading conversion assembly 32 by a temperature sensor wire 26, a pitot impact pressure line 28, and a pitot static pressure line 30 for each of the four pitot tubes 16 included in the gas velocity sensing probe 12. Accordingly, in the illustrated embodiment, each gas velocity sensing probe 12 is coupled to the associated sensor reading conversion assembly 32 by four temperature sensor wires 26, four pitot impact pressure lines 28, and four pitot static pressure lines 30. It should be noted that some or all of the lines 28 and 30 may be replaced by other suitable connections if different gas flow sensing devices are used. If desired, the wires 26 and lines 28 and 30 may be bundled together (as shown in FIGS. 1 and 5) to form a sensor transmission cord 24 or the wires 28 and lines 30 may be left separate. In any event, as seen in FIG. 5, each temperature sensor wire 26 is connected to a temperature-to-current (or other parameter) converter 50. In addition, each pitot impact pressure line 28 and pitot static pressure line 30 is connected to a blow back system 52 which is operable to force compressed air through the lines 28 and 30 for purging purposes.

Each pitot impact pressure line 28 and pitot static pressure line 30 is coupled through the blow back system 52 to a pressure transducer 54. The pressure transducers 54 develop pressure indication signals which may be provided to a single data logger 36 which is in turn connected to a computer 40 by a computer cable 38. The data logger may also receive signals developed by the temperature-to-current converters 50. The data logger 36 and/or the computer 40 may be operative to take substantially simultaneously all of the readings from the pressure transducers 54 and the temperature-to-current converters 50 either a single time, or preferably, a number of times at regular or irregular intervals. The computer 40 may be suitably programmed to analyze and summarize the data obtained and display the data and/or the summary or summaries, preferably in a graphical and/or tabular format.

If desired, one or more optional indicating devices (not shown) may be provided as part of the sensor conversion assembly to receive the signals developed by the devices 50, 54 and indicate the sensed pressure and/or temperature.

The pressure and temperature readings obtained at each pitot tube may be converted to a gas flow value by using the following formula:

$$Vs = \sqrt{\frac{(Ts + 460)}{Ms \times Ps}} \times \sqrt{\Delta P} \times Cp \times 85.49$$

$Vs$ = Gas velocity (ft/sec)

$Ts$ = Absolute gas temperature (°R)

$Ms$ = Molecular weight of gas, wet basis (lb/lb-mole)

$Ps$ = Absolute pressure of gas (in. $Hg = Pbar + Pg$)

$\Delta P$ = Velocity head of gas (in $H_2O$)

$Cp$ = Pitot tube coefficient (dimensionless)

$Vs$ = Gas velocity (ft/sec)

$A$ = Cross-sectional area of stack or duct (ft$^2$)

The gas velocity reading is converted to a gas volumetric flow rate by the following formula:

Acfm=$\overline{Vs} \times A \times 60$

Acfm=gas volumetric flow rate, in actual cubic feet per minute $\overline{Vs}$=average gas velocity (ft/sec), calculated using average $\sqrt{\Delta P}$ of all the points on the traverse By fixing each individual flow sensor at each sample point on a specified traverse for the duration of the measurement period for all repetitions, the present invention essentially eliminates repositioning and movement errors by eliminating the need to do such repositioning and movement. In addition, the present invention eliminates the error associated with the reading of the fluctuating incline manometer by reading and recording the data electronically. Furthermore, taking the readings electronically at all points on a specified traverse substantially simultaneously greatly reduces the amount of time to take a complete traverse, which in turn reduces the cost and increases the number of repetitions to increase the confidence in the accuracy of the overall measurements.

Beyond all of those benefits that would currently be perceived by the marketplace, the present invention offers completely new opportunities for gas flow rate data analysis which are not currently contemplated because of its ability to substantially eliminate the time between taking readings at individual sample points on a traverse. When non-simultaneous readings are taken, it is very difficult to determine if the overall flow rates have actually changed between readings or if there is simply a variation between flow rates at the positions at which the readings are taken. Obtaining repetitions of flow rate parameter readings at all points on the traverse substantially simultaneously allows for the measurement and observation of changes in gas flow characteristics across the cross section over time as a function of various system design, operating and troubleshooting conditions. Analysis of this type of data would also be very useful in determining whether or not a particular location in the duct is representative of the actual flow rate over time to determine if that particular site is suitable for the installation of a continuous flow monitoring device. The present invention would, for the same reasons, also be useful in detecting the nature, extent and occurrence of gas turbulence under various operating conditions.

The foregoing description is given for clearness of understanding only, and no unnecessary limitations should be understood therefrom, as modifications within the scope of the invention will be apparent to those skilled in the art.

What is claimed is:

1. A method for measuring gas flow in a conduit, the method comprising the steps of:
   (a) providing a plurality of differential pressure gas flow measuring devices;
   (b) positioning the differential pressure gas flow measuring devices at a plurality of positions in the conduit; and
   (c) substantially simultaneously measuring the flow of gas at each position.

2. The method of claim 1, further comprising the step of repeating steps (a)–(c) at regular time intervals.

3. The method of claim 1, further comprising the step of using a computer to analyze the gas flow measurements.

4. The method of claim 1, further comprising the steps of summarizing the data and displaying the summarized data.

5. The method of claim 1, wherein the differential pressure gas flow measuring devices are positioned in a single cross section of the conduit.

6. The method of claim 1, wherein the differential pressure gas flow measuring devices are s-type pitot tubes.

7. The method of claim 1, wherein the differential pressure gas flow measuring devices are standard pitot tubes.

8. The method of claim 1, wherein the differential pressure gas flow measuring devices are 3-D pitot tubes.

9. The method of claim 1, including the further steps of providing a plurality of temperature sensors positioned at a plurality of positions in the conduit and substantially simultaneously taking measurements from the plurality of temperature sensors.

10. A gas flow velocity measuring apparatus, comprising:
   a plurality of probes disposed at different locations in a conduit, each probe including at least one differential pressure gas flow measuring device;
   a sensor conversion assembly connected to each probe; and
   means for substantially simultaneously taking readings from each differential pressure gas flow measuring device.

11. The apparatus of claim 10, wherein the means for substantially simultaneously taking readings comprises a data logger connected to the sensor conversion assemblies and a computer connected to the data logger.

12. The apparatus of claim 10, wherein the probes are positioned in a single cross section of the conduit.

13. The apparatus of claim 10, wherein the differential pressure gas flow measuring devices are s-type pitot tubes.

14. The apparatus of claim 10, wherein the differential pressure gas flow measuring devices are standard pitot tubes.

15. The apparatus of claim 10, wherein the differential pressure gas flow measuring devices are 3-D pitot tubes.

16. The apparatus of claim 10, further including a plurality of temperature sensors positioned at a plurality of positions in the conduit and a data logger connected to the plurality of temperature sensors for substantially simultaneously taking measurements from the plurality of temperature sensors.

17. A gas flow measuring apparatus comprising:
(a) a plurality of flow-measuring probes, each probe including at least one differential pressure gas flow measuring device;
(b) a separate pressure transducer connected to each differential pressure gas flow measuring device;
(c) a data logger connected to the transducers; and
(c) a computer connected to the data longer.

18. The apparatus of claim 17, wherein the probes are positioned at a single axial location of a conduit.

19. The apparatus of claim 17, wherein the differential pressure gas flow measuring devices are s-type pitot tubes.

20. The apparatus of claim 17, wherein the differential pressure gas flow measuring devices are standard pitot tubes.

21. The apparatus of claim 17, wherein the differential pressure gas flow measuring devices are 3-D pitot tubes.

22. The apparatus of claim 17, further including a plurality of temperature sensors positioned at a plurality of positions in the conduit wherein the data logger is connected to the plurality of temperature sensors and operable to take substantially simultaneous measurements from the plurality of temperature sensors.

23. A gas flow measuring apparatus comprising:
(a) a plurality of differential pressure gas flow measuring devices disposed at a plurality of positions in a conduit;
(b) a pressure transducer connected to the differential pressure gas flow measuring devices; and
(c) a data logger connected to the pressure transducer.

24. The gas flow measuring apparatus of claim 23, further comprising a computer connected to the data logger.

* * * * *